US012793012B2

(12) United States Patent
Nema

(10) Patent No.: US 12,793,012 B2
(45) **Date of Patent: *Nov. 10, 2026**

(54) SYSTEMS AND METHODS FOR PRIVACY-PRESERVING ORCHESTRATION OF BLIND LOGISTICS, PAYMENTS, AND IDENTITY ASSERTION IN DISTRIBUTED ENVIRONMENTS

(71) Applicant: Waleed S Nema, Garland, TX (US)

(72) Inventor: Waleed S Nema, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/447,052

(22) Filed: Jan. 13, 2026

(65) Prior Publication Data

US 2026/0195708 A1 Jul. 9, 2026

Related U.S. Application Data

(63) Continuation-in-part of application No. 19/334,453, filed on Sep. 19, 2025, now Pat. No. 12,626,249, and a continuation-in-part of application No. 19/315,444, filed on Aug. 29, 2025, now Pat. No. 12,556,907.

(51) Int. Cl.
*G06Q 10/087* (2023.01)
*H04L 9/40* (2022.01)

(52) U.S. Cl.
CPC ..... *G06Q 10/0874* (2025.08); *H04L 63/0442* (2013.01); *H04L 63/08* (2013.01)

(58) Field of Classification Search
CPC .. G06Q 10/0874; H04L 63/0442; H04L 63/08
USPC ........................................................... 705/28
See application file for complete search history.

(56) References Cited

U.S. PATENT DOCUMENTS

2008/0016357 A1* 1/2008 Suarez ................ H04L 63/0823 713/176
2016/0192194 A1* 6/2016 Yang ................... H04W 12/082 713/171
2020/0137058 A1* 4/2020 Allen .................. H04L 63/0815
2021/0176054 A1* 6/2021 Zabar .................... H04L 9/0894

OTHER PUBLICATIONS

Rabbani, Hasnain et al. Enhancing security in financial transactions: a novel blockchain-based federated learning framework for detecting counterfeit data in fintech. PeerJ Computer Science, 2024. (Year: 2024).*

* cited by examiner

*Primary Examiner* — Fawaad Haider

(57) ABSTRACT

A distributed computing architecture for privacy-preserving orchestration of physical fulfillment and commercial transactions. The system separates the functions of Identity, Logistics, and Transaction Processing into distinct, architecturally constrained domains. A Relying Partner (RP), operating as a "Blind" Orchestrator, manages user entitlements via a persistent pseudonymous identifier (gUserID) without accessing the user's real-world identity. The user's identity is established via a pluggable "Identity Selector" layer that supports Institutional (IdP), Self-Sovereign (Wallet), or Headless (FIDO2) authentication. The RP facilitates physical delivery via a Third-Party Logistics Provider (LP) using non-PII "Shipping Tokens" and processes financial transactions via a Payment Processor (PP) using "Payment Tokens." This "Triple-Blind" architecture ensures that a user's legal name, physical location, and financial credentials are never aggregated in a single data store.

3 Claims, 2 Drawing Sheets

System Architecture (The "Triple-Blind" Map)

SYSTEMS AND METHODS FOR PRIVACY-PRESERVING ORCHESTRATION OF BLIND LOGISTICS, PAYMENTS, AND IDENTITY ASSERTION IN DISTRIBUTED ENVIRONMENTS

CROSS-REFERENCE TO RELATED APPLICATIONS

This application is a continuation-in-part of U.S. patent application Ser. No. 19/334,453, filed Sep. 19, 2025, which is a continuation-in-part of U.S. patent application Ser. No. 19/315,444, filed Aug. 29, 2025, the disclosures of which are incorporated herein by reference in their entirety.

FEDERALLY SPONSORED RESEARCH AND DEVELOPMENT

Not Applicable.

REFERENCE TO A "SEQUENCE LISTING", A TABLE, OR A COMPUTER PROGRAM LISTING APPENDIX SUBMITTTED ON A COMPACT DISC AND AN INCORPORATION-BY-REFERENCE OF THE MATERIAL ON THE COMPACT DISC

Not Applicable.

REFERENCES CITED

Background of the Invention

Field of the Invention

The present invention relates generally to distributed data processing, privacy-preserving computing, and electronic commerce logistics. More specifically, it pertains to systems and methods for architecturally segregating Personally Identifiable Information (PII) from behavioral and transactional data in distributed networks to enable "blind" physical fulfillment and identity-agnostic orchestration.

Description of Related Art

The digitization of commerce and education has created a fundamental tension between service delivery and user privacy. While cryptographic techniques exist to secure data in transit (e.g., TLS) and at rest (e.g., AES), current architectural models inevitably force the aggregation of sensitive data by the primary service provider.

A. Conventional E-Commerce and Drop-Shipping

In standard electronic commerce architectures, the merchant (or "Relying Partner") serves as the central aggregator of transaction data. To fulfill an order, the merchant must collect the user's name and shipping address. Even in "drop-shipping" models, where a third-party manufacturer fulfills the order, the merchant collects the PII from the user and transmits it to the manufacturer.

Deficiency: This architecture creates a privacy failure point. The merchant accumulates a massive database linking physical addresses to purchase history/behavior. Existing solutions for "anonymous" shipping (e.g., P.O. boxes) are manual logistical workarounds that do not integrate cryptographically with the digital authentication session, failing to provide a seamless, privacy-preserving user experience.

B. Secure Delivery and Locker Systems

Prior art exists regarding user-specified delivery locations (e.g., U.S. Pat. No. 11,216,843 to Amazon Technologies). These systems allow users to select a secure locker or alternative pickup location to obscure their home address from a delivery driver.

Deficiency: While these systems shield data from the last-mile carrier, they rely on a centralized platform architecture where the platform operator possesses full knowledge of the user's identity, home location, and locker selection. They do not teach a decentralized architecture where the selling platform is architecturally constrained to be ignorant of the delivery destination.

C. Payment and Data Tokenization

Tokenization is widely used in financial processing (e.g., U.S. Patent Pub. No. 2014/0279679) to replace sensitive financial instruments (like a Primary Account Number) with a non-sensitive equivalent. Similarly, shipping label generation systems (e.g., U.S. Pat. No. 10,726,423 to eBay) use identifiers to reference shipping data.

Deficiency: Current tokenization methods are designed primarily for security (preventing data theft) or convenience (formatting labels), rather than privacy segregation. In these systems, the merchant typically retains the ability to resolve the token or possesses the underlying billing data for fraud verification (AVS). The prior art does not teach a "Triple-Blind" workflow where the merchant possesses the User ID but not the Address, and the Logistics Provider possesses the Address but not the User ID, bridged solely by an opaque token generated via a direct user-to-provider redirect.

Unsolved Problem

Consequently, a need exists for a distributed computing architecture that enforces a "Separation of Knowledge" at the structural level. Specifically, a need exists for a system that enables a Relying Partner to trigger physical delivery and process payments without ever ingesting or storing the user's legal name, physical location, or financial credentials, thereby eliminating the "honeypot" risk inherent in centralized e-commerce models.

SUMMARY OF THE INVENTION

The present invention solves the "Privacy Paradox" by providing a system for "Blind Orchestration." The system decouples the monolithic merchant stack into a federated network of "Blind" and "Sighted" components:

1. The Identity Selector (the Input)
   The system abstracts authentication into a pluggable layer. The user can prove their identity via an Institution (e.g., organization HR, University Registrar), a Self-Sovereign Wallet (e.g., Blockchain), or a Device Credential (e.g., FIDO2). Regardless of the source, the Relying Partner (RP) receives only a persistent, pseudonymous gUserID.
2. Blind Logistics (The Output): A Third-Party Logistics Provider (LP) collects shipping PII directly from the user via a secure redirect, bypassing the RP. The LP issues a non-PII Shipping Token to the RP. The RP uses this token to command the shipment of goods without ever processing the destination address.

3. Blind Payments (The Fuel): Similarly, financial PII is handled exclusively by a Payment Processor (PP), which issues a Payment Token to the RP.
4. AI Data Monetization (The Asset): Because the RP holds rich behavioral data (e.g., purchase history, preferences) linked only to a pseudonym (gUserID), this data is "Born-Safe." It can be replicated to a Cross-Organizational Corpus for AI training and monetization without the legal and ethical risks associated with PII aggregation.

The Blind Processing Environment may comprise a diagnostic system, decision-support system, a learning system, or any other computation engine operating without access to PII.

BRIEF DESCRIPTION OF DRAWINGS

The following is a brief description of the drawings.

DESCRIPTION OF THE INVENTION

A. Definitions

1. No-PII Environment:

A computing environment architecturally constrained to prevent PII processing or storage.

2. gUserID:

A persistent, PII-free, globally unique identifier serving as the sole handle for a user within the No-PII Environment.

3. Relying Partner (RP):

An entity operating a service (e.g., a Store, an LMS, a Healthcare App) that orchestrates transactions without accessing PII.

4. Logistics Provider (LP):

A third party holding shipping PII and issuing Shipping Tokens.

5. Identity Source:

The origin of the user's gUserID, which may be an Identity Provider (IdP), a Digital Wallet, or a FIDO Authenticator.

6. Blind Processing Environment:

A generic term for a "Clean Room" execution environment (e.g., a Learning Gym or Medical Diagnostic Engine) that processes raw interaction data without PII.

Crypto Terms

7. Capability Token:

A cryptographically verifiable credential issued by a relying authority (e.g., the RP) that grants the bearer specific access rights to a Blind Processing Environment (e.g., the Gym) without referencing the bearer's legal identity.

8. Opaque Identity Envelope:

An encrypted data structure containing identity-related assertions or PII, generated by an Identity Source (e.g., IdP or Wallet) and encrypted such that it can only be decrypted by a specific destination authority (e.g., the Registrar or Arena), rendering it opaque and indecipherable to any intermediate systems (such as the Relying Partner) that transmit or store it.

9. Proof of Possession (POP):

A cryptographic mechanism wherein a device presenting a token must also generate a valid digital signature using a private key associated with that token, thereby proving that the token was not simply stolen or copied (replay attack prevention).

10. Token Routing:

A transmission method wherein the user client device acts as the sole bridge between isolated domains, receiving cryptographic artifacts from an issuing authority and presenting them to a verifying authority, such that the authorities do not communicate directly with one another, thereby preventing backend identity correlation.

B. System Architecture (FIG. 1)

Figure 1:
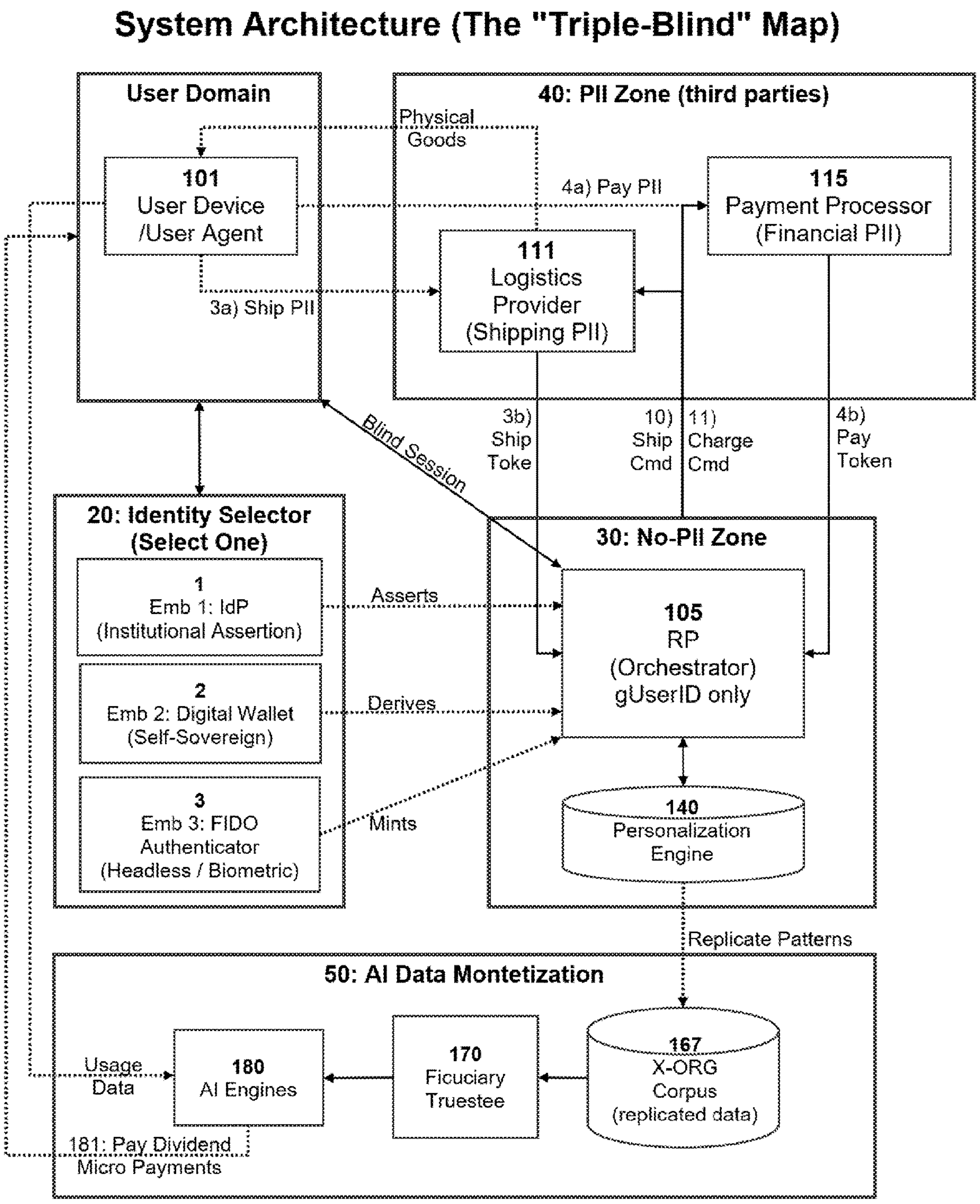
FIG. 1: A system architecture diagram illustrating the Triple-Blind Infrastructure, wherein the Identity Source is depicted as a selectable module enabling Institutional (IdP), Self-Sovereign (Wallet), or Headless (FIDO2) authentication flows to establish the pseudonymous gUserID at the Relying Partner.

As illustrated in FIG. 1, the system architecture is defined by a strict boundary between the User Domain (10), the No-PII Zone (30), and the PII Zone (40).

The Identity Selector (20): This module resides in the User Domain. It allows the user to select how they wish to be known. It feeds into the RP (105).

The Relying Partner (105): This is the "Brain" of the operation. It knows What happened (transactions, behavior) and Who did it (pseudonymously via gUserID), but it does not know Where the user is or What their legal name is.

The PII Zone (40): This contains the Logistics Provider (111) and Payment Processor (115). These entities know the Address and Credit Card, but they do not know the user's history or behavioral profile. They operate as "dumb pipes" for physical and financial routing.

AI Data Monetization (50): Because the RP's database (140) contains no toxic PII, it can replicate patterns to an X-ORG Corpus (167). An AI Engine (180) trains on this data and pays dividends back to the ecosystem, creating a privacy-safe data economy.

C. Cryptographic Artifacts and Capability Tokens

The user device functions as a Cryptographic Bridge, carrying artifacts between mutually non-trusting entities to ensure that authorization and record reconciliation can occur without the entities exchanging PII directly.

1. The Capability Token (Access): To access a "Clean Room" like a Learning Gym, the user presents a Capability Token issued by the RP (e.g. a blind Learning Management System). The Gym verifies the token's signature to confirm eligibility (e.g., "Student is enrolled") without needing to know who the student is.
2. The Opaque Identity Envelope (Reconciliation): In scenarios where the Blind System must eventually report back to a Sighted System (e.g., sending a grade to a Registrar), the user device carries an Opaque Identity Envelope. This envelope is encrypted by the IdP and can only be decrypted by the IdP (or a designated Verifier). The Blind RP (e.g. Blind LMS) treats this envelope as a "black box" payload, attaching the exam score to it and returning it to the user or forwarding it to the IdP. This ensures the RP never sees the identity data inside.

3. Proof of Possession: To prevent token theft, the system employs Proof of Possession (PoP). The user device generates a unique, ephemeral key pair during the session. All tokens issued to the device are bound to its public key. Access requests must be signed by the device's private key, ensuring that even if a token is intercepted, it cannot be used by an attacker on a different device.

D. The Identity Selector Logic (FIG. 2)

Figure 2:
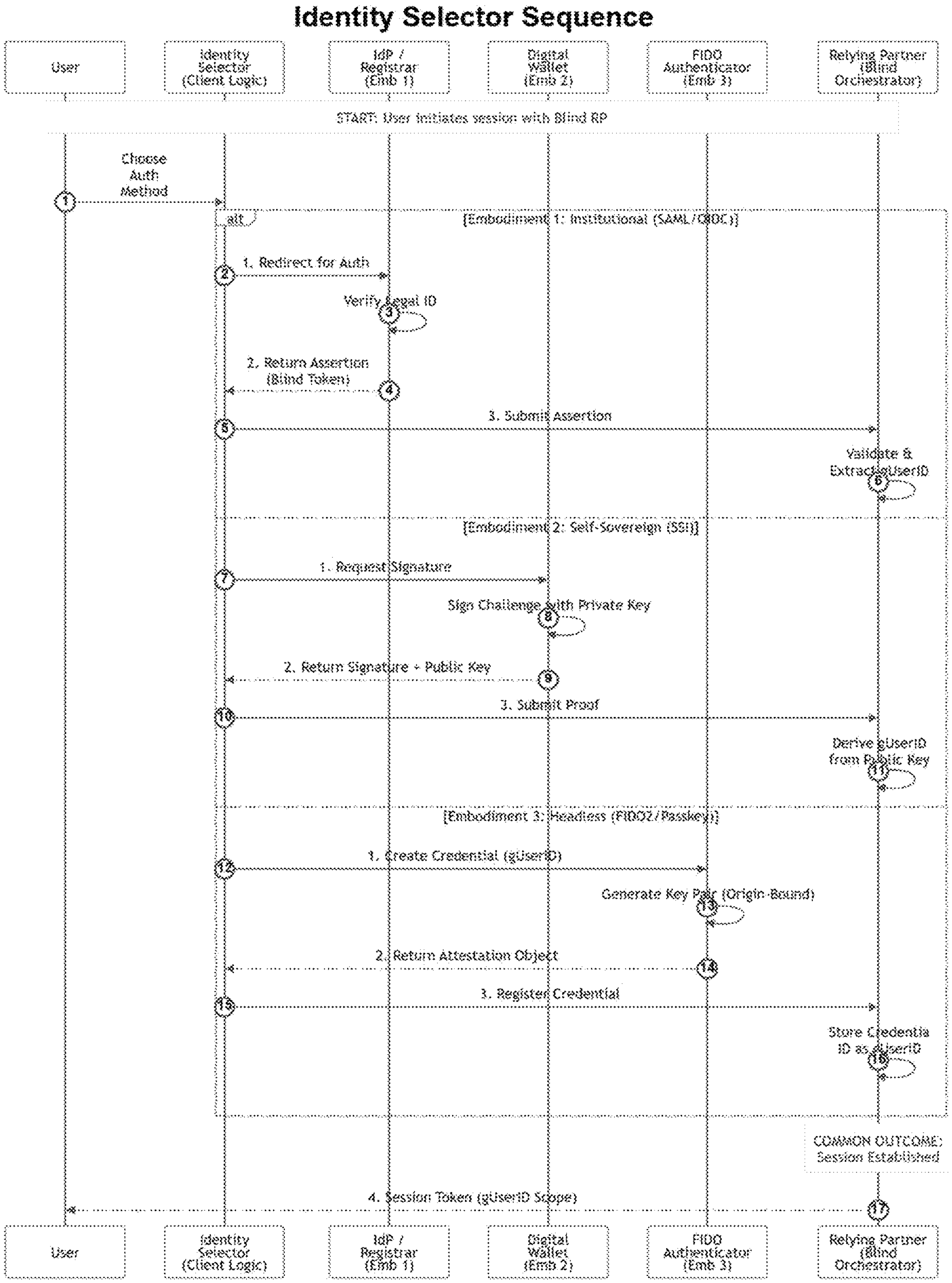
FIG. 2: A sequence diagram illustrating the "Identity Selector" logic, wherein the system supports three alternative authentication pathways that converge on the common outcome of establishing a pseudonymous gUserID session at the Relying Partner.

The system supports three distinct embodiments for establishing the gUserID, as detailed in FIG. 2:

Embodiment 1: Institutional Assertion (Path 1). The user authenticates with a traditional IdP (e.g., University Registrar or Corporate HR). The IdP verifies the legal identity and signs a "Blind Assertion Token" containing the gUserID. The RP trusts the IdP's signature.

Embodiment 2: Self-Sovereign Identity (Path 2). The user authenticates using a Digital Wallet (e.g., Ethereum, Verifiable Credentials). The gUserID is cryptographically derived from the user's public key (e.g., a hash of the wallet address). The user signs a challenge to prove ownership. This allows for "Direct-to-Consumer" relationships where the user owns their data.

Embodiment 3: Headless/FIDO2 (Path 3). The user registers directly with the RP using a device-bound authenticator (TouchID, YubiKey). The device generates a unique Credential ID, which serves as the gUserID. This enables a completely anonymous, passwordless account bound only to the physical device.

E. the Blind Logistics Workflow

The core innovation for physical fulfillment operates as follows:

1. Redirect: When a user wishes to ship an item, the RP redirects the client device to the LP (111).
2. Direct Entry: The user enters their address directly into the LP's secure form. The RP never sees this data.
3. Token Issuance: The LP generates a Shipping Token (a random UUID) representing that address and returns it to the RP.
4. Blind Command: To ship the item, the RP sends a command to the LP: "Ship Item X to Token Y." The LP resolves Token Y to the physical address and prints the label.

F. Commercial Ramifications

This architecture allows the Relying Partner to operate with significantly reduced liability (no PII to hack) while enabling advanced features like Personalization (140) and AI Training (50). It transforms privacy from a compliance cost into a structural asset.

CONCLUSION, RAMIFICATIONS, AND SCOPE

A The reader will see that the systems and methods of the various embodiments described herein provide a robust architectural solution to the "Privacy Paradox" in distributed computing. By orchestrating a "Triple-Blind" interaction—separating Identity, Logistics, and Transaction Processing—the invention enables high-value services (physical delivery, financial transactions, and personalized data processing) without requiring the service provider to aggregate the toxic assets of Personally Identifiable Information (PII).

Furthermore, the introduction of the Identity Selector layer transforms the system from a rigid institutional tool into a universal privacy protocol. It allows the system to function equally well for a university student (asserted by a Registrar), a crypto-native user (asserted by a Wallet), or a privacy-conscious consumer (asserted by a FIDO device), all while using the same underlying blind infrastructure.

While the above description contains many specificities, these should not be construed as limitations on the scope of the invention, but rather as an exemplification of preferred embodiments thereof. Many other variations are possible. For example:

Beyond E-Commerce: The "Blind Logistics" architecture enables "Blind Healthcare" logistics, where a patient can receive a sensitive medical testing kit (via the LP) and receive a diagnosis (via a Blind RP/Gym) without the diagnostic provider ever knowing the patient's legal identity or physical location.

Beyond Physical Goods: The "Shipping Token" mechanism may be adapted for Digital Rights Management (DRM), where the token represents a capability to decrypt a specific digital asset rather than a physical destination, enabling content delivery without tracking user consumption history.

Beyond Compliance: The architecture facilitates "Whistleblower Protection" or anonymous reporting systems, where an organization (IdP) can verify that a report came from a valid employee (gUserID) without being able to trace the specific individual who submitted it.

Protocol Independence: While specific standards such as FIDO2, OHTTP, and JWT are cited as exemplary technologies, the "Entitlement Token" and "Blind Assertion" mechanisms may be implemented using other cryptographic standards, such as Verifiable Credentials (VCs), Zero-Knowledge Proofs (ZKPs), or homomorphic encryption, without departing from the spirit of the invention.

Accordingly, the scope of the invention should be determined not by the embodiments illustrated, but by the appended claims and their legal equivalents.

The invention claimed is:

1. A system for privacy-preserving physical fulfillment in a distributed network, the system comprising:

a Relying Partner (RP) computing system comprising one or more processors and a memory configured to maintain a user profile associated with a persistent, Personally Identifiable Information (PII)-free globally unique user identifier (gUserID), wherein the RP computing system is architecturally constrained to prevent storage of user shipping addresses;

a Third-Party Logistics Provider (LP) computing system, operated by a legal entity separate from an operator of the RP computing system; and an Identity Source module residing in a user domain configured to establish said gUserID at the RP computing system via a selected one of a plurality of authentication pathways comprising an institutional identity provider pathway, a self-sovereign digital wallet pathway, and a device-bound headless authenticator pathway;

wherein the RP computing system is configured to:
establish an authenticated session with a client device via a cryptographic exchange that retrieves said gUserID from the Identity Source module;
redirect the client device to the third-party LP computing system to establish a shipping destination;
receive, from the third-party LP computing system via a network anonymization layer that obscures an internet protocol (IP) address of the client device from the RP computing system, a non-PII Shipping Token generated by the LP computing system in response to the user providing shipping PII directly to the LP computing system via a secure user interface provided directly by the LP computing system that explicitly bypasses the RP computing system;
store a mapping between the gUserID and the Shipping Token;
transmit a fulfillment instruction to the LP computing system comprising the Shipping Token and item details, without transmitting shipping PII; and
replicate pseudonymous behavioral data associated with the gUserID to a separate cross-organizational corpus for artificial intelligence (AI) model training, wherein said replicated data is structurally devoid of shipping address information, contingent upon verification of a multi-tiered user and organizational opt-in consent sequence.

2. A computer-implemented method for facilitating blind interactions, comprising:
Establishing, by a Relying Partner (RP) computing system, an authenticated session with a user identified by a pseudonymous Personally Identifiable Information (PII)-free globally unique user identifier (gUserID) via a cryptographic exchange with a client device connected to an Identity Source module, wherein the RP does not possess PII of the user and is architecturally constrained to prevent storage of user shipping addresses;
Redirecting the client device to a secure user interface provided directly by a Third-Party Logistics Provider (LP) computing system to enter shipping address data, explicitly bypassing the RP computing system;
Receiving, at the RP computing system from the Third-Party Logistics Provider (LP) computing system via a network anonymization layer that obscures an internet protocol (IP) address of the client device, a non-PII Shipping Token that references the shipping address stored securely by the LP computing system, the Shipping Token being cryptographically unique to a specific pair of the RP computing system and the user;
Associating, by the RP computing system, the Shipping Token with the gUserID by storing a mapping in memory;
Transmitting, from the RP computing system to the LP computing system, a request to ship a physical item, the request including the Shipping Token and being devoid of any PII of the user; and
Replicating pseudonymous behavioral data associated with the gUserID from the memory of the RP computing system to a separate cross-organizational data corpus configured to train an artificial intelligence (AI) machine learning model, following a verification check of a multi-tiered user and organizational opt-in consent sequence.

3. A non-transitory computer-readable storage medium having stored thereon instructions that, when executed by a processor of a Relying Partner (RP) system, cause the RP system to:
authenticate a user via a cryptographic exchange connected to an Identity Source module operating a selected one of an institutional provider pathway, a digital wallet pathway, and a device authenticator pathway that returns a pseudonymous Personally Identifiable Information (PII)-free globally unique user identifier (gUserID) without revealing user PII to establish a session within an environment architecturally constrained against storing user shipping addresses;
obtain a non-PII Shipping Token from an external Logistics Provider (LP) system via a network anonymization layer subsequent to redirecting a user interface context to a secure data entry form operated exclusively by the external LP system that explicitly bypasses the RP system, said token representing a verified shipping destination for the user and being cryptographically unique to a specific pair of the RP system and the user;
process a transaction for a physical good associated with the gUserID;
trigger a physical fulfillment of the good by sending a command to the LP system comprising the Shipping Token, such that the RP system facilitates delivery without obtaining the shipping destination; and
replicate pseudonymous behavioral data associated with the gUserID to a separate cross-organizational data corpus configured for artificial intelligence (AI) model training, wherein said replicated data is structurally devoid of shipping address information, only after confirming a verified multi-tiered user and organizational opt-in consent authorization path.

* * * * *